(12) United States Patent
Binder et al.

(10) Patent No.: US 9,261,177 B2
(45) Date of Patent: Feb. 16, 2016

(54) CAMSHAFT WITH AXIALLY MOVABLE CAM PACK

(75) Inventors: Thomas Binder, Feldkirch (AT); Peter Wiesner, Mauren (LI)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days.

(21) Appl. No.: 14/130,185

(22) PCT Filed: Jun. 29, 2012

(86) PCT No.: PCT/EP2012/062719
§ 371 (c)(1),
(2), (4) Date: Feb. 10, 2014

(87) PCT Pub. No.: WO2013/001067
PCT Pub. Date: Jan. 3, 2013

(65) Prior Publication Data
US 2014/0144282 A1 May 29, 2014

(30) Foreign Application Priority Data
Jun. 30, 2011 (DE) .......................... 10 2011 051 480

(51) Int. Cl.
*F16H 53/00* (2006.01)
*B21D 53/84* (2006.01)
(Continued)

(52) U.S. Cl.
CPC ............... *F16H 25/10* (2013.01); *B21D 53/845* (2013.01); *B22D 19/00* (2013.01); *F01L 1/047* (2013.01);
(Continued)

(58) Field of Classification Search
CPC ........ F16H 53/025; F16H 25/10; F01L 1/047;
F01L 2001/0471; F01L 2001/0473; F01L
2013/0052; B21D 53/845; Y10T 74/2012;
Y10T 29/49293; B22D 19/00
USPC ......... 74/567, 568 R; 123/90.17, 90.18, 90.6;
29/888.1; 464/160, 161, 182
See application file for complete search history.

(56) References Cited

U.S. PATENT DOCUMENTS 5,041,253 A 8/1991 Husted
5,979,381 A 11/1999 Korostenski et al.
(Continued)

FOREIGN PATENT DOCUMENTS

CH 694277 A5 10/2004
CN 1922389 A 2/2007
(Continued)

OTHER PUBLICATIONS

Machine translation of DE 102009022657 A1 obtained on Mar. 10, 2015.*

*Primary Examiner* — Adam D Rogers
(74) *Attorney, Agent, or Firm* — Laurence Greenberg; Werner Stemer; Ralph Locher

(57) ABSTRACT

A camshaft includes a carrier shaft which can be mounted rotatably along a shaft axis and at least one cam pack or package axially displaceably disposed on the carrier shaft. The cam pack includes at least two cams and at least one adjusting member for axial adjustment of the cam pack. The cams and the at least one adjusting member are cast integrally with a carrier body in an axially adjacent configuration and are connected to one another by the carrier body. The cams and/or the adjusting member include an inner toothing which engages in an axially displaceable manner with an outer toothing of the carrier shaft. A cam pack and a method for producing a camshaft are also provided.

12 Claims, 5 Drawing Sheets

(51) Int. Cl.

| | | |
|---|---|---|
| *F01L 1/04* | (2006.01) | |
| *F16H 25/10* | (2006.01) | |
| *F01L 1/047* | (2006.01) | |
| *F16H 53/02* | (2006.01) | |
| *B22D 19/00* | (2006.01) | |
| *F16H 25/08* | (2006.01) | |
| *F01L 1/34* | (2006.01) | |
| *F01L 13/00* | (2006.01) | |

(52) U.S. Cl.
CPC . *F01L 1/34* (2013.01); *F16H 25/08* (2013.01); *F16H 53/025* (2013.01); F01L 2001/0473 (2013.01); F01L 2013/0052 (2013.01); *Y10T 29/49293* (2015.01); *Y10T 74/2101* (2015.01); *Y10T 74/2102* (2015.01)

(56) References Cited

U.S. PATENT DOCUMENTS

| | | | |
|---|---|---|---|
| 6,427,653 B1 * | 8/2002 | Hara et al. | 123/90.17 |
| 7,305,953 B2 | 12/2007 | Walz | |
| 7,513,232 B2 | 4/2009 | Schneider | |
| 8,113,163 B2 * | 2/2012 | Clever et al. | 123/90.6 |
| 8,495,980 B2 * | 7/2013 | Scherzinger et al. | 123/90.6 |
| 8,662,043 B2 * | 3/2014 | Dollinger et al. | 123/90.6 |
| 8,701,609 B2 * | 4/2014 | Wahl et al. | 123/90.16 |
| 2006/0266492 A1 | 11/2006 | Wu | |
| 2007/0074685 A1 | 4/2007 | Walz | |
| 2007/0240657 A1 | 10/2007 | Schneider | |
| 2014/0137826 A1 * | 5/2014 | Binder et al. | 123/90.18 |
| 2014/0144401 A1 * | 5/2014 | Binder et al. | 123/90.18 |
| 2014/0165776 A1 * | 6/2014 | Binder et al. | 74/568 R |
| 2014/0174248 A1 * | 6/2014 | Paul et al. | 74/567 |
| 2014/0223736 A1 * | 8/2014 | Kim et al. | 29/888.1 |

FOREIGN PATENT DOCUMENTS

| | | | |
|---|---|---|---|
| CN | 101900002 A | | 12/2010 |
| DE | 2914095 A1 | | 10/1980 |
| DE | 4004505 A1 | | 8/1991 |
| DE | 19546366 A1 | | 6/1997 |
| DE | 19837385 A1 | | 2/2000 |
| DE | 102004009074 B3 | | 7/2005 |
| DE | 102004022849 A1 | | 12/2005 |
| DE | 102004058622 A1 | | 6/2006 |
| DE | 102005058548 A1 | | 6/2007 |
| DE | 102008064340 A1 | | 6/2010 |
| DE | 102009022657 A1 | | 1/2011 |
| DE | 1020090552222 A1 | | 5/2011 |
| DE | 102010060766 A1 | | 5/2012 |
| EP | 1754913 A2 | | 2/2007 |
| GB | 275842 | * | 8/1927 |
| JP | 5639356 A | | 4/1981 |
| JP | 558138214 A | | 8/1983 |
| JP | H03242405 A | | 10/1991 |
| JP | 2001355709 A | | 12/2001 |
| JP | 1942657 A | | 4/2007 |

* cited by examiner

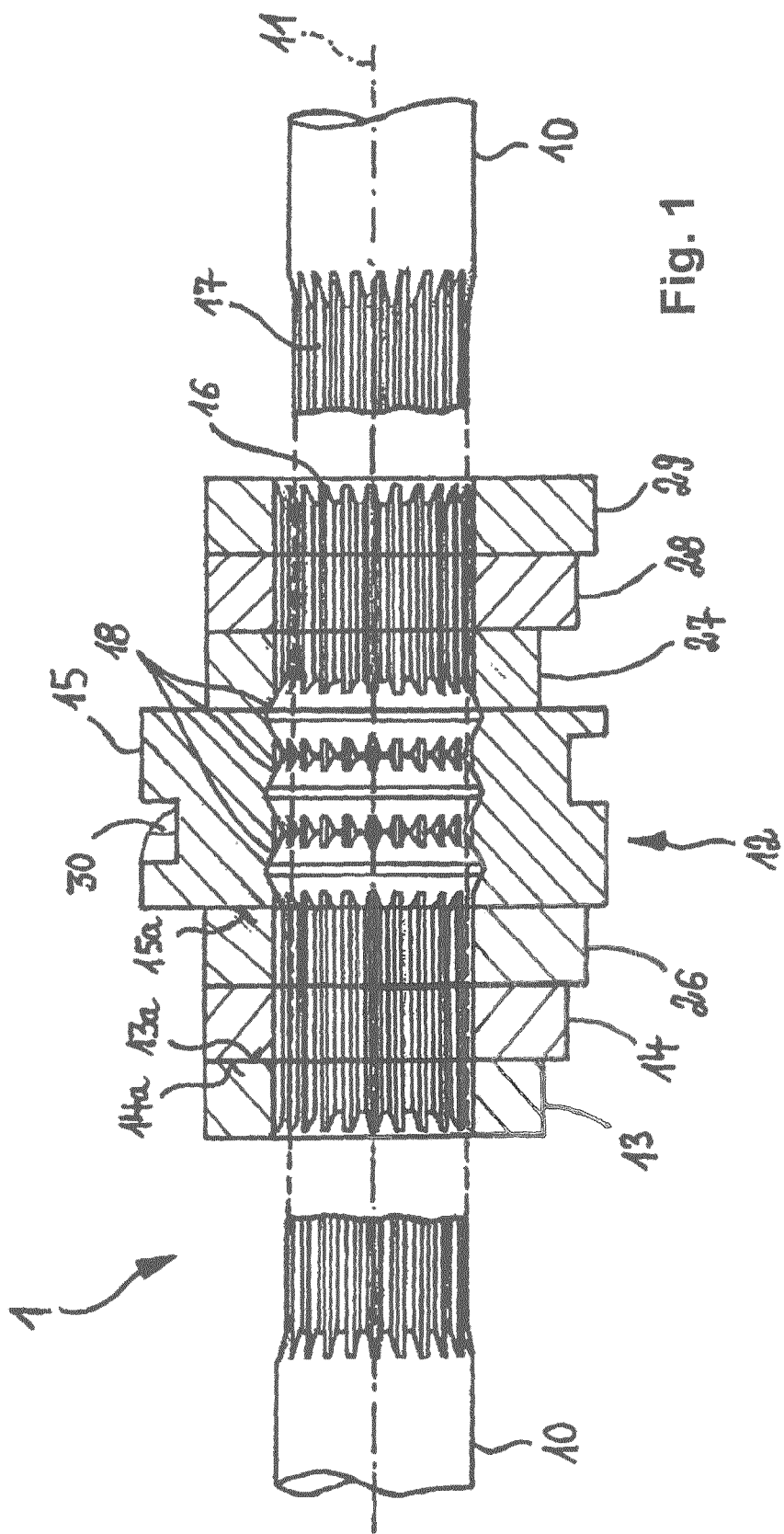

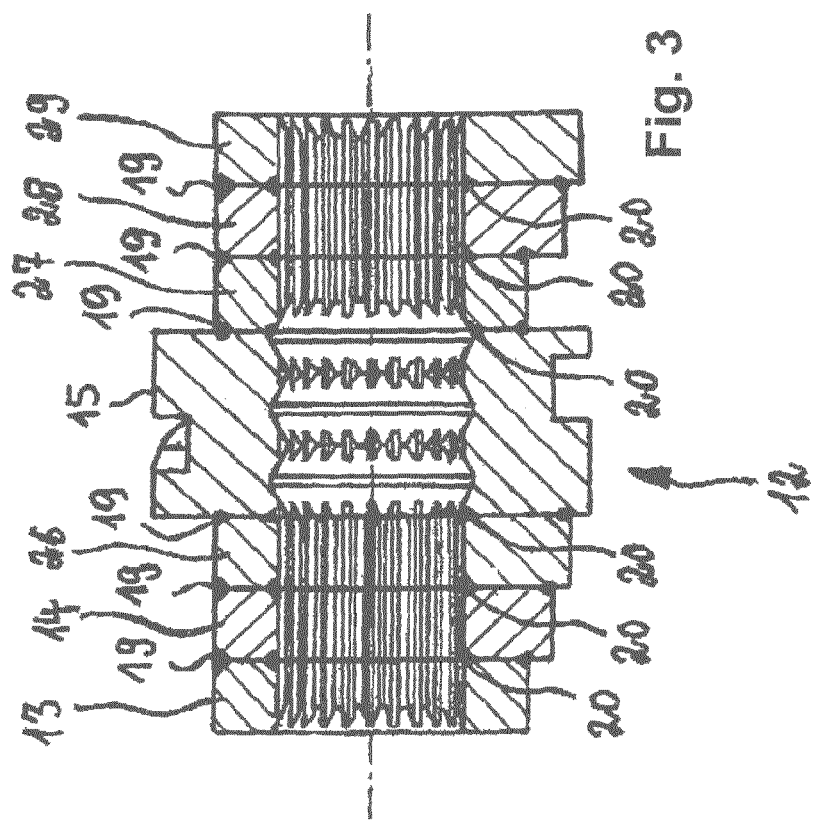
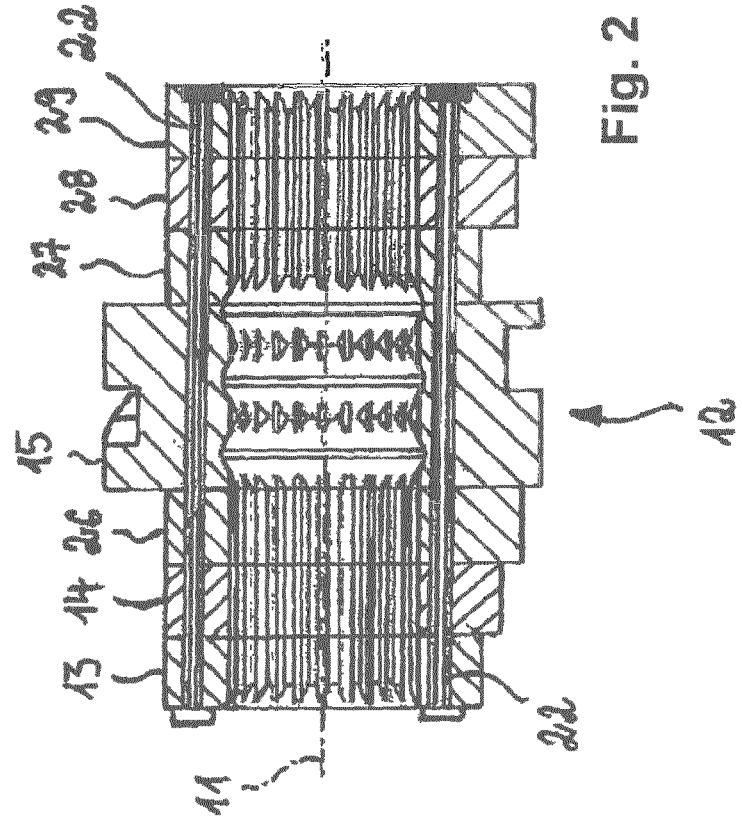

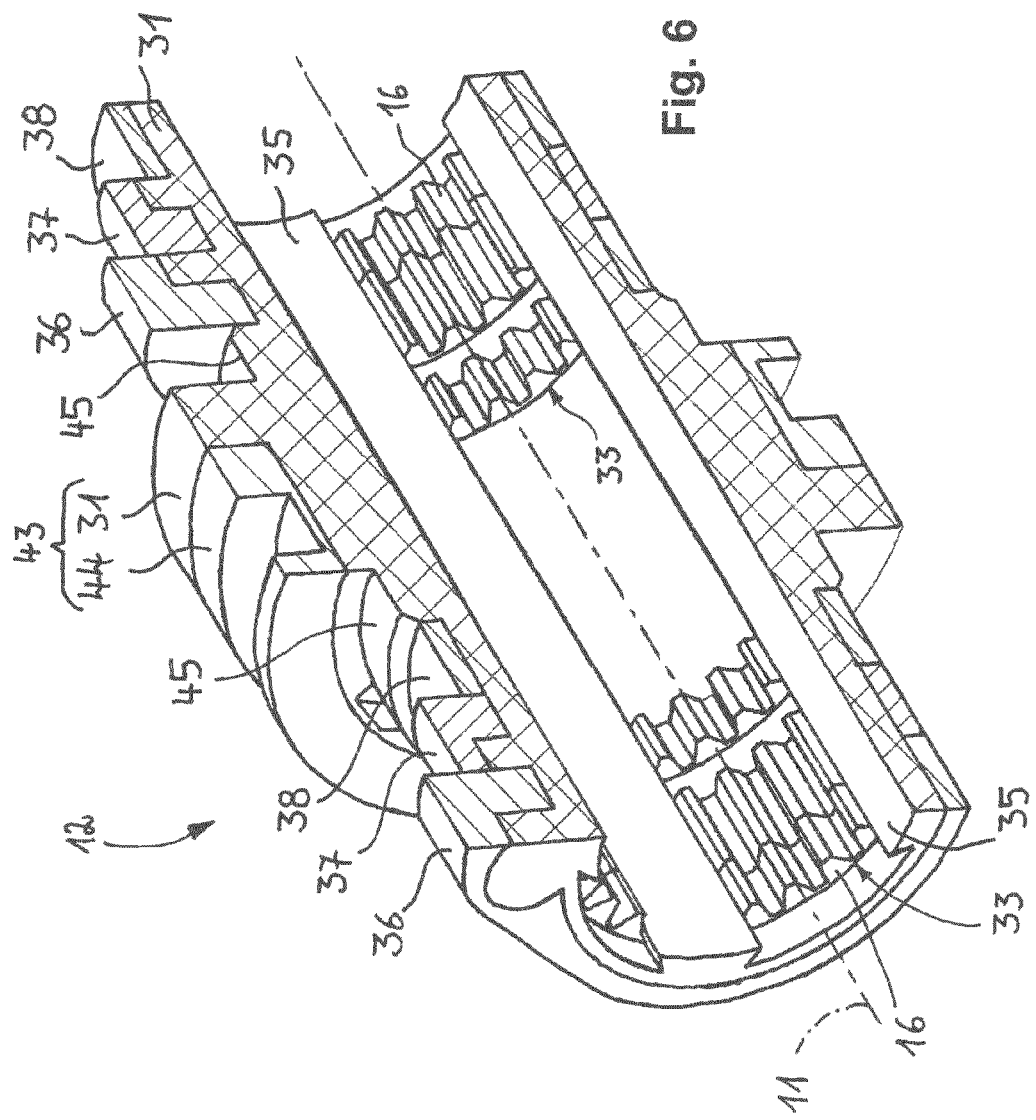

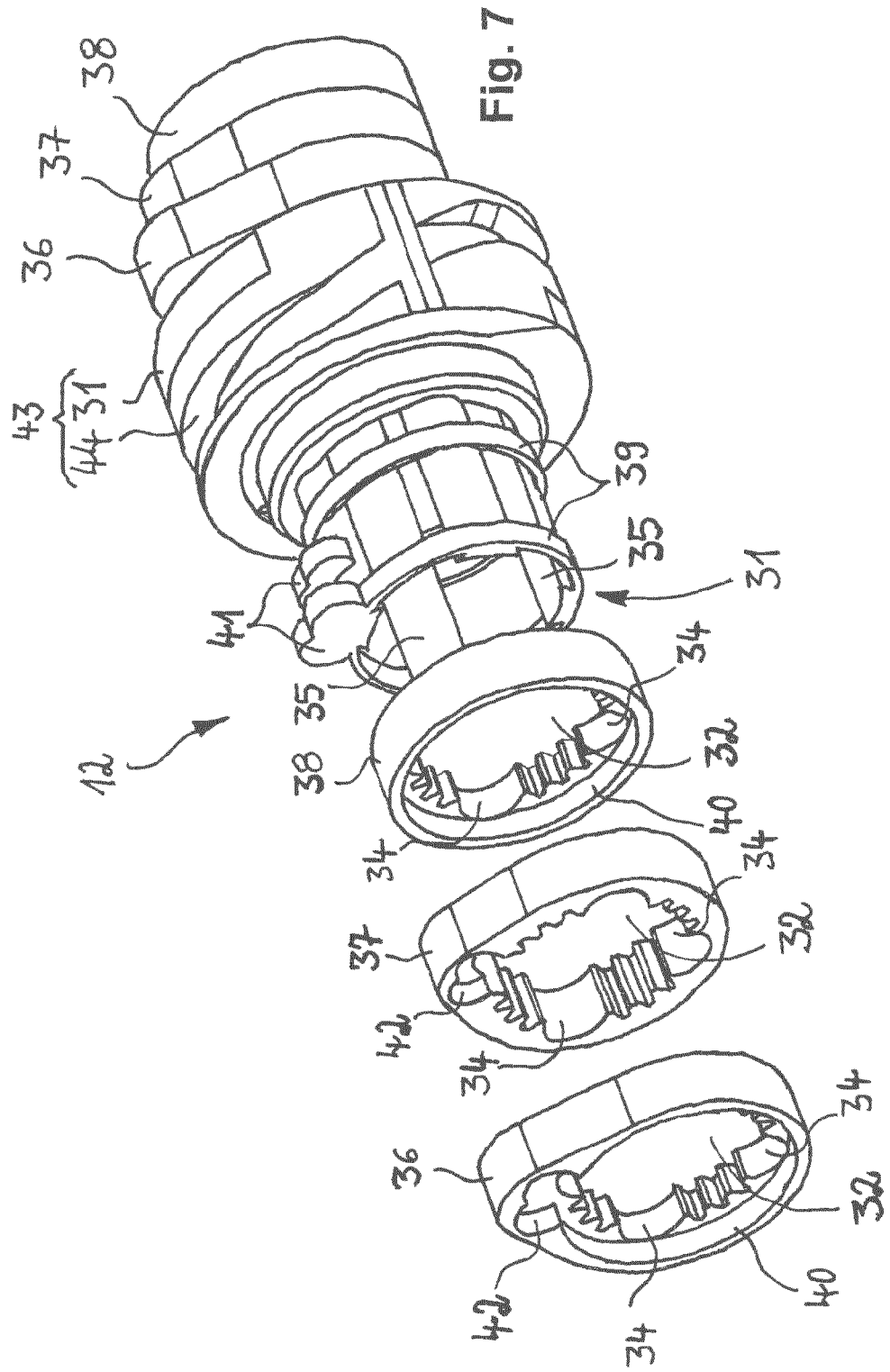

CAMSHAFT WITH AXIALLY MOVABLE CAM PACK

BACKGROUND OF THE INVENTION

Field of the Invention

The invention relates to a camshaft with a carrier shaft which can be mounted rotatably in a shaft axis, wherein at least one cam pack is disposed axially displaceable on the carrier shaft, and wherein the cam pack comprises at least two cams and at least one adjusting member for the axial adjustment of the cam pack.

Such camshafts are used for internal combustion engines, which can be operated with an adjustable valve lift or with adjustable valve control times. The valves of the internal combustion engine are controlled by means of cam packs, which are disposed axially displaceable on the rotating carrier shaft. The valves can be controlled with different cams by the axial displacement of the cam pack on the carrier shaft, wherein the different cams can have different cam shapes. The cam lobes can be more or less geometrically pronounced or the position of the cam lobes can be varied relative to one another in the circumferential direction. Cams are also known that are constituted as zero-lift cams.

Cam packs comprise a plurality of cams, wherein at least one adjusting member is a component of the cam pack, by means of which the axial displacement is introduced into the cam pack.

There is known from DE 10 2009 022 657 A1 a camshaft with a carrier shaft, which can be mounted rotatably in the shaft axis in order to be operated in an internal combustion engine. Disposed on the carrier shaft is a cam pack, which is constituted for example by four cams. The cam pack comprises a carrier tube, which is disposed axially displaceable on the carrier shaft by means of an inner toothing and an outer toothing, so that the rotary motion of the carrier shaft is transmitted via a geometrical form-fit connection to the carrier tube. A plurality of cams are disposed on the carrier tube, so that the cam pack comprises four cams with two different cam contours. For the axial displacement of the cam pack, the carrier tube comprises axial stops, in which curved paths are introduced on the external periphery, said curved paths being able to cooperate with a transmission element.

DE 10 2004 011 586 A1 shows a further camshaft with a carrier shaft, and a carrier tube is shown which is constituted in one piece with a plurality of cams. The carrier tube comprises an inner toothing, which engages with an outer toothing of the carrier shaft in order to dispose the cam pack in an axially displaceable manner on the carrier shaft, and at the same time to produce a rotary transmission of the carrier shaft to the cam pack by means of a geometrical form-fit connection. The carrier tube comprises a bearing element between the cam contours in order to mount the cam pack rotatably in a bearing block, which can for example be a component of the cylinder head.

The camshafts according to the prior art disadvantageously comprise cam packs which necessitate a carrier tube produced from a steel material in an assembled variant in order to joint various control elements and adjusting members in a costly way to form a cam pack, and which have to be produced solidly. The carrier tube serves for the mounting on the carrier shaft and comprises the necessary inner toothing which can engage with the outer toothing on the carrier shaft. Disadvantageously, an expensive structure arises due to the use of a carrier tube for mounting the cams and adjusting members, and the cams have to be disposed with a necessary jointing technique on the carrier tube. If the carrier tube and the cams and also, for example, the adjusting member are constituted as a whole in one piece, a component arises which is expensive to produce and on which a large number of processing operations have to be carried out, and all the components have to be produced from the same material. However, it is technically advantageous to be able to carry out both the machining and the heat treatment of various elements of the cam pack individually.

BRIEF SUMMARY OF THE INVENTION

The object of the present invention consists in providing a camshaft with a cam pack, which overcomes the aforementioned drawbacks of the prior art and has a simple structure, wherein the various elements of the cam pack can also be machined and heat-treated individually.

This object is solved proceeding from a camshaft with a carrier shaft which can be mounted rotatably along a shaft axis. At least one cam pack or package is disposed axially displaceably on the carrier shaft and includes at least two cams and at least one adjusting member for axial adjustment of the cam pack. The cams and the at least one adjusting member are cast integrally with a carrier body in an axially adjacent configuration and are connected to one another by the carrier body. The cams and/or the adjusting member include an inner toothing which engages in an axially displaceable manner with an outer toothing of the carrier shaft. Advantageous developments of the invention are given in the dependent claims.

The invention includes the technical teaching that the cams and the at least one adjusting member are cast integral with a carrier body in an axially adjacent arrangement and are connected to one another by means of the latter.

The invention proceeds from the idea of connecting the individual control elements of the cam pack directly to one another in order to constitute the cam pack without the use of a carrier tube. According to the invention, the connection of the individual control elements such as the cams, the adjusting member or also a bearing element are cast in a carrier body, and a simple structure of the cam pack is enabled by the casting technique, wherein the various elements of the cam pack can previously be machined and heat-treated individually before they are cast with one another by means of the body. Individual cams or one or more cams and for example the adjusting member can be previously connected at least partially to one another with firm bonding-type methods or mechanically with connecting elements, then being cast with the body using the method according to the invention. As a result of the direct connection of the cams and of the at least one adjusting member to the cams disposed adjacent to the latter, in the general idea of the invention also each element participating in a cam pack, and as a result of the integral casting of a body, the use of a metallic carrier tube that has to be provided beforehand as an individual part becomes unnecessary, and the cams and the at least one adjusting member can be disposed axially displaceable directly on the carrier shaft. As a result of the direct connection of the cams to one another and of the adjusting member to the cams disposed adjacent to the latter, a composite structure of individual elements is created which can be machined individually before being connected jointly to one another. After the composite structure comprising the cams and the adjusting member has being created, the latter can be disposed directly on the carrier shaft without further use of an individual carrier tube or any other element.

The invention offers the particular advantage of constituting the cams and the adjusting member for the direct arrangement on the carrier shaft with an inner toothing, which engages in an axially displaceable manner with an outer toothing of the carrier shaft and at the same time can transmit torques in the circumferential direction. The inner toothing is preferably introduced directly into the cams and/or into the adjusting member, but not into the cast carrier body, in order to dispose the formed cam pack on the carrier shaft in an axially displaceable and rotation-transmitting manner. The carrier body thus preferably has no torque-transmitting contact with the carrier shaft.

As a further advantage, it is possible for example for only outer elements, for example a first outer cam and a mutually opposite second outer cam, to be constituted with an inner toothing, which can engage with a, for example, continuous outer toothing on the carrier shaft. The advantage is thus obtained that only two elements of the cam pack have to be constituted with an inner toothing, which preferably terminate the cam pack on the outside. Further elements of the cam pack, which are disposed between the elements disposed on the outside with the inner toothing, can optionally comprise further inner toothings.

The cast carrier body can comprise cutouts, through which the inner toothing extends pointing radially inwards, so that despite the presence of a carrier body, which extends for example over the entire length of the cam pack, the inner toothing in the cams and/or in the adjusting member can be brought into direct engagement with the outer toothing on the carrier shaft. The cams and the adjusting member comprise through-bores, through which the carrier shaft extends, and the inner toothing can be limited to individual regions on the inner side of the through-bores. Once the carrier body is cast, the latter surrounds at the edge the regions in which the inner toothing is present in the through-bores, so that the inner toothing can extend radially inwards through the cutouts thus formed in the carrier body.

Furthermore, convex regions can be provided in the through-bores, into which convex regions a securing section of the carrier body is introduced. For example, three or more convex regions can be provided preferably distributed uniformly over the circumference of the through-bores, and a securing section of the carrier body extends into each of the convex regions. The securing section is formed by a moulding in the convex regions, whereby the material of the carrier body is cast and thus passes into the convex regions. The form-fit connection thus arises between the cast carrier body and the cams or the adjusting member in the circumferential direction.

It is also conceivable for the cast carrier body to comprise circumferential collars which are cast in recesses, wherein the recesses are introduced into the cams, so that an axial securing of the cams is created. The collars are also moulded in the recesses of the cams or the adjusting member during the production of the collars in the casting process of the carrier body; in particular, an at least small degree of shrinkage can occur during the hardening and/or the cooling of the cast carrier body, which produces a permanent axial bracing on the cams and the adjusting member. For example, a shoulder can be provided between the cams and the adjusting member, said shoulder forming a free portion of the cast carrier body and thus producing a buffer effect with the axial bracing. The recesses into which the collars of the carrier body engage are disposed on the side of the cams that is turned away from the adjusting member, so that a form-fit connection between the cams and the adjusting member arises with the bracing of the cams and the adjusting member.

As a further advantage, the cast carrier body can comprise integral mouldings, which extend into cutouts that are introduced into the cams. Securing of the cams against rotation around the shaft axis can be created by the integral mouldings which are molded in the cutouts.

The adjusting member can be constituted in at least two parts, wherein a first part is constituted by a control contour element and a further part can be constituted by the cast carrier body, in particular so that the control contour element is embedded in the carrier body. The embedding of the control contour element in the carrier body takes place by the material of the carrier body being cast around the control contour element, so that the latter protrudes out of the carrier body only with the control contour in the outer surface. The adjusting member does not therefore comprise an inner toothing, and does not therefore participate in the connection between the cam pack and the carrier shaft. On the contrary, the control contour element can be treated during handling as a cam element, and the material of the carrier body infiltrates both the cams and the control contour element.

As a further advantage, at least one latching groove can be introduced into at least one of the cams, but preferably into the adjusting member, said latching groove being able to cooperate with a latching means for the axial latching of the cam pack, said latching means being disposed in the carrier shaft. The latching means can for example be a spring-loaded ball, which is pressed into the latching grooves. Defined axial positions of the cam pack can thus be defined by the axial adjustment, wherein the number of latching grooves preferably corresponds to the number of cams of differing cam contour. The latching grooves can be introduced particular advantageously into elements of the cam pack that are not constituted with an inner toothing.

The cams and the adjusting member can be connected to one another at least over partial regions of their respective end faces. The end faces can be formed by plane faces, with which the shaft axis forms a surface normal. Once the cams and the adjusting member are brought flat one against the other in an axially adjacent arrangement, the connection can be made between the cams and/or the adjusting member. The connections can be constituted particularly advantageously as firmly bonded connections.

The firmly bonded connections between the cams and the at least one adjusting member and the cams adjacent thereto can be carried out by means of weld joints, and weld joints can be disposed for example on the outer periphery and/or on the inner periphery. The weld joints can be produced for example with a laser beam welding method or with an electron beam welding method, in order to minimise the thermally influenced material zone in the cams and/or in the adjusting member. Furthermore, the thermal distortion of the pack arrangement of the cam pack can be minimised by these welding methods. The weld joint can be produced particularly advantageously with the formation of a vapour capillary, in order to produce a particularly deep weld between the end faces of the cams and/or the adjusting member, so that the weld joint is capable of withstanding particularly high mechanical loads.

According to a possible embodiment of the invention, the firmly bonded connections between the cams and the at least one adjusting member can be carried out by means of solder joints and/or adhesive joints. In principle, finish machining of the functional surfaces of the cams and/or the adjusting member can take place after the firmly bonded connections are have been produced between the cams and/or the adjusting member.

As a further advantage, the connections between the cams with one another and of the adjusting member to the cams disposed adjacent thereto can be constituted by at least one and preferably a plurality of tie rods distributed uniformly on the periphery of the cam pack, said tie rod or rods extending through the cams and the adjusting member. The tie rods can be constituted by threaded bolts or suchlike and can take up a tensile stress after arrangement in the cam pack. The cams and the adjusting member are consequently pressed axially against one another in order to form a mechanically loadable composite structure comprising the cams and the adjusting member. Alternatively, it is also conceivable to connect the cams to one another and the adjusting member to its adjacent cams by means of one or more rivet joints. As a further advantage, the cams and the adjusting member can for example be pinned together, or form-fit geometries can be provided on the end faces of the cams and the adjusting member in order then to pass the tie rods through the cams and the adjusting member and thus to place them under tensile stress.

As a further possible embodiment of the invention, the connections of the cams and of the at least one adjusting member to its adjacent cams can be constituted in each case by at least one mechanically fitted jointing element acting in a form-fit manner which is preferably disposed on the cams and/or at least one adjusting member or is constituted between the end faces and acts in a form-fit manner in addition to the cast carrier body. The jointing elements acting in a form-fit manner can be constituted in one piece with the cams and/or the adjusting member or can even be moulded onto the latter. For example, threaded joints, bayonet joints, undercut joints or other joints can be provided between the cams and/or the adjusting member, or jointing elements such as slot nuts or suchlike are provided. In principle, any possible connection embodiment can be provided between the cams and/or the adjusting member in order to connect the latter to one another in a mechanically loadable manner. The connection of the cams and/or the adjusting member should preferably be able to be produced free from play, and the connection should maintain the rotational position of the elements around the common shaft axis.

According to a further advantageous embodiment, the cam pack can comprise at least one bearing element, which is preferably constituted for the formation of a zero-lift cam. A zero-lift cam comprises a cylindrical lateral surface, wherein the bearing element can have an axial width which enables both the bearing of the cam pack by means of the bearing element as well as the simultaneous active connection of the bearing element to a tappet of the valve control.

The invention further relates to a cam pack comprising at least two cams and at least one adjusting member for the axial adjustment of the cam pack on a carrier shaft, wherein the cams and the at least one adjusting member are cast integral with a carrier body in an axially adjacent arrangement and are connected to one another by means of the latter and are constituted as a composite structure for direct arrangement on the carrier shaft. The advantages and embodiments of the aforementioned camshaft with a corresponding cam pack are also taken into account for the generic cam pack.

The invention further relates to a method for producing a camshaft with a carrier shaft which can be mounted rotatably in a shaft axis, wherein at least one cam pack is disposed axially displaceable on the carrier shaft and wherein the cam pack comprises at least two cams and at least one adjusting member for the axial adjustment of the cam pack, wherein according to the invention the method comprises at least the steps of arranging at least two cams in a position adjacent to the adjusting member, the at least partial casting around the cams and the adjusting member with a carrier body in order to form a composite structure and the direct arrangement of the composite structure on the carrier shaft.

The method thus comprises the introduction of an inner toothing into the cams and/or into the adjusting member in order to be engaged in an axially displaceable manner with an outer toothing on the carrier shaft. The inner toothing is introduced directly into the material of the cams and/or of the adjusting member. According to a further method step, there is introduced into at least one cam and/or into the adjusting member at least one latching groove, which can cooperate with a latching means for the axial latching of the cam pack, said latching means being disposed in the carrier shaft.

According to a possible embodiment of the method according to the invention, the inner toothing can be introduced in each case individually into the cams and into the adjusting member, the cams and the adjusting member only being mutually jointed subsequently in an axially adjacent arrangement.

Alternatively, the cams and the adjusting member can be mutually jointed in an axially adjacent arrangement, the inner toothing only then being introduced into the cams and into the adjusting member. In the same way, the at least one latching groove can be introduced before or after the jointing of the cams and the adjusting member with one another.

Furthermore, the method can make provision such that the adjusting member is constituted in two parts, and a first part is constituted by a control contour element, around which partial casting takes place with a portion of the carrier body in the casting process. The control contour element itself forms a kind of annular body which, like the cam elements, can be brought into position in order then to cast the carrier body integral with the elements.

In order to perform the method, the at least one cam and the adjusting member can be introduced into an original moulding tool in an arrangement axially adjacent to one another, wherein the carrier body is then cast by a casting process into a hollow space bordered by the original moulding tool, the cams and the adjusting member. The cams and the adjusting member or the control contour element can, when being placed in the original moulding tool, already be positioned and held in such a way that the subsequent position for the formation of the cam pack is already produced by the original moulding tool. The material for the formation of the carrier body can then be cast or injected into the original moulding tool, so that the latter then hardens. A composite structure is thus formed, which holds the cams and the adjusting member or the control contour element together to form a cam pack.

BRIEF DESCRIPTION OF THE SEVERAL VIEWS OF THE DRAWING

Further features improving the invention are represented in greater detail below with the aid of the figures, together with the description of preferred examples of embodiment of the invention. In the figures:

FIG. 1 shows a cross-sectional view through a camshaft with a cam pack, which is constituted with the features of the present invention, FIG. 2 shows a cross-sectional view of a cam pack according to a first example of embodiment for the formation of the connections between the cams and the adjusting member, FIG. 3 shows a cross-sectional view of a cam pack according to a second example of embodiment for the formation of the connections between the cams and the adjusting member, FIG. 6 shows an example of embodiment of a cam pack with the features of the present invention comprising a cast body and FIG. 7 shows the example of embodiment of the cam pack according to FIG. 6 in an exploded view.

DESCRIPTION OF THE INVENTION

Figure 5:
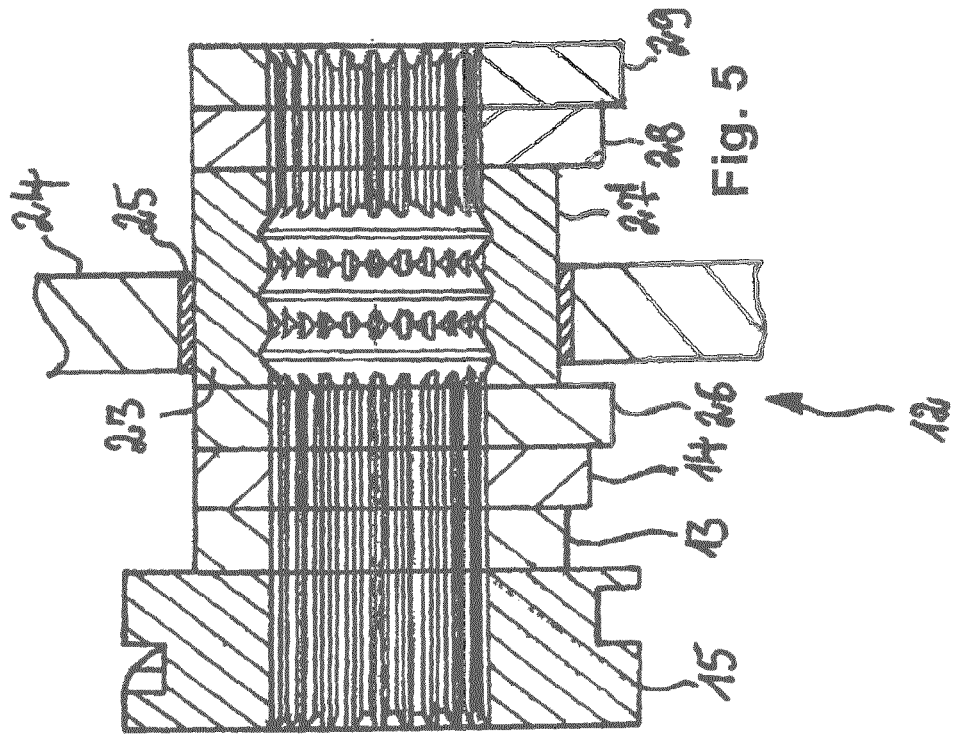
FIG. 5 shows a further example of embodiment of a cam pack, which comprises a bearing element for the mounting in a bearing.

FIG. 1 shows an example of embodiment of a camshaft 1 with a cam pack 12, which is constituted with the features of the present invention. Camshaft 1 comprises a carrier shaft 10, which is shown interrupted in the seating region of cam pack 12. Carrier shaft 10 can be mounted rotatably in a shaft axis 11, for example in the cylinder head of an internal combustion engine.

Cam pack 12 comprises for example six cams 13, 14, 26, 27, 28 and 29, wherein an adjusting member 15 is provided, and a groove guide 30 is introduced in adjusting member 15 on the outer periphery of the adjusting member 15. Cams 13, 14 and 26 are located on a first side of adjusting member 15, and cams 27, 28 and 29 are located on an opposite, second side of adjusting member 15. A through-bore, through which carrier shaft 10 is passed, extends through cams 13, 14, 26, 27, 28, 29 and through adjusting member 15. An inner toothing 16 is introduced in this through-bore formed by the individual components of cam pack 12, said inner toothing engaging with an outer toothing 17 on carrier shaft 10 in an axially displaceable and torque-transmitting manner. Outer toothing 17 of carrier shaft 10 is constituted wider in the direction of shaft axis 11 than the width of cam pack 12, and cam pack 12 can be adjusted axially in the direction of the shaft axis, whereby an adjusting element is guided in groove guide 30 of adjusting member 15. As a result of the form-fit connection of inner toothing 16 and outer toothing 17, a rotary motion of the carrier shaft 10 is at the same time transmitted to cam pack 12.

Cams 13, 14, 26, 27, 28, 29 and adjusting member 15 are connected to one another in an axially adjacent arrangement with one another, so that, as a result of the connection of these components of cam pack 12 via their respective end faces constituted in the axial direction, a composite structure is created which forms cam pack 12. According to the invention, this does not require a carrier tube on which the individual components such as cams 13, 14, 26, 27, 28, 29 and adjusting member 15 have to be disposed. Inner toothing 16 and latching grooves 18 can thus be introduced directly into cams 13, 14, 26, 27, 28, 29 and into adjusting member 15, wherein for example three latching grooves 18 are introduced on the inside into adjusting member 15, which are able to cooperate with a latching means for the axial latching of cam pack 12, said latching means being disposed in carrier shaft 10 in a manner not shown in detail.

Cams 13, 14, 26, 27, 28, 29 each have different cam contours, for example cams 13, 14, 26, 27, 28, 29 can have different cam lobes or the cam lobes are constituted at different angles around the circumference. As a result of the axial adjustability of cam pack 12, tappets having a fixed axial position can cooperate with different cams 13, 14, 26 or 27, 28, 29, in order for example to change the valve lift, but also for example to change the valve control times.

FIG. 2 shows a first example of embodiment for the formation of the composite structure of cams 13, 14, 26, 27, 28, 29 and adjusting member 15. The connection is constituted by tie rods 22, and by way of example two tie rods 22 are represented over the periphery of cam pack 12, wherein in particular more than two tie rods 22 can be provided, which are disposed uniformly distributed on the periphery of cam pack 12. Tie rods 22 extend parallel to shaft axis 11 through cams 13, 14, 26, 27, 28, 29 and adjusting member 15 and are placed under axial tensile stress. The components of cam pack 12 are thus pressed against one another at the end faces in order to form a mechanically loadable composite structure. Tie rods 22 can be constituted as screw elements or as dowel pins, in order to introduce a tensile stress into tie rods 22.

FIG. 3 shows a further example of embodiment for the formation of cam pack 12, wherein the connections between cams 13, 14, 26, 27, 28, 29 and adjusting member 15 are constituted by weld joints 19, 20. Weld joints 19 are constituted as weld joints on the outer periphery and weld joints 20 are constituted as weld joints on the inner periphery. Weld joints 19 and 20 constituted on the outer periphery and on the inner periphery are shown merely by way of example, wherein for example only weld joints 20 on the inner periphery may be sufficient to form a mechanically loadable composite structure of the components of cam pack 12. Weld joints 19 and 20 can be produced for example by laser beam welding procedures or by electron beam welding procedures, in order to minimise the thermal effect on cams 13, 14, 26, 27, 28, 29 and adjusting member 15.

Figure 4:
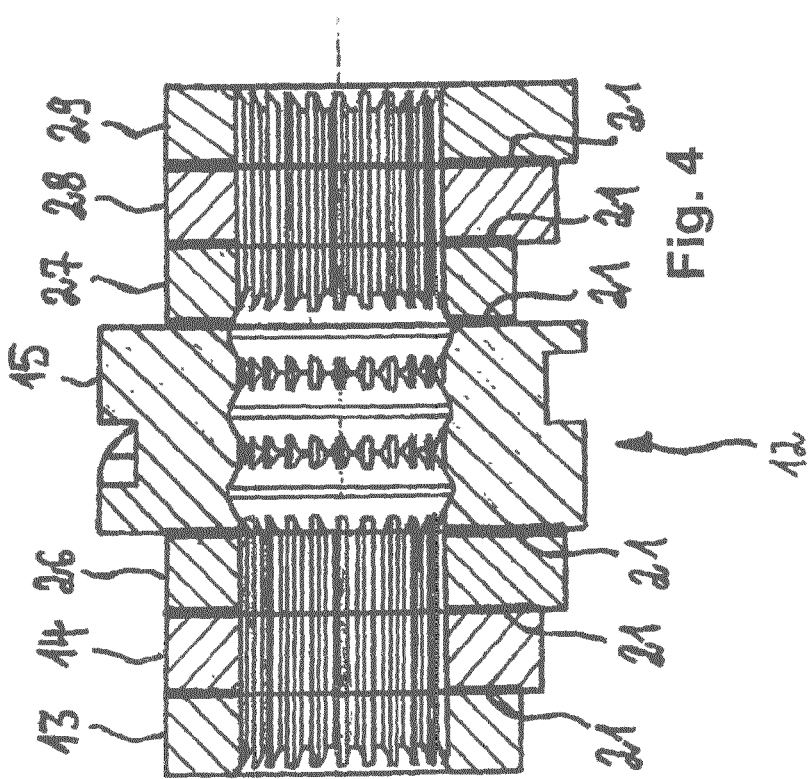
FIG. 4 shows a cross-sectional view of a cam pack according to a further example of embodiment for the formation of the connections between the cams and the adjusting member.

FIG. 4 shows a further example of embodiment for the formation of cam pack 12, wherein cams 13, 14, 26, 27, 28, 29 are connected to one another and adjusting member 15 to adjacent cams 26, 27 by solder joints 21. Solder joints 21 can be prepared for example by soldering foils, which are disposed between the individual components of cam pack 12 and, after the arrangement of cams 13, 14, 26, 27, 28, 29 and adjusting member 15 in an axially adjacent arrangement with respect to one another, cam pack 12 thus prepared can be brought to the solder melting temperature in order to finish solder joints 21. As an alternative to shown solder joints 21, adhesive joints can be provided between the components of cam pack 12.

Finally, FIG. 5 shows a further embodiment of a cam pack 12 with an adjusting member 15 and cams 13, 14, 26, 27', 28, 29, wherein cam 27' is also constituted as a bearing element 23. The cam 27' is constituted as a zero-lift cam and has a cylindrical outer circumference. Besides the tapping—not shown in detail—by means of a tappet for the valve control, cam pack 12 is mounted in a bearing block 24, into which a bearing 25 is introduced. Cam 27' thus performs both as a zero-lift function for the valve control as well as the function for the bearing of cam pack 12. The connection between the components of cam pack 12 can be constituted according to the example of embodiment in FIG. 2, in FIG. 3 or in FIG. 4.

As a result, a cam pack 12 is created which can be constituted without the use of a carrier tube. Furthermore, the possibility remains of feeding the different components of cam pack 12 in each case individually to mechanical and/or thermal processing steps, the components only then being connected to one another to form a cam pack 12.

Inner toothing 16, which is introduced into cams 13, 14, 26, 27, 28, 29 and into adjusting member 15, can be introduced individually into the respective components before the creation of the jointing connections or inner toothing 16 is introduced into cam pack 12 when the jointing connections between the individual components have already been created.

FIG. 6 shows an example of embodiment of a cam pack 12 according to the invention, which extends along shaft axis 11 and can be accommodated on a carrier shaft 10, as is shown in FIG. 1. The example of embodiment of cam pack 12 shows cams 36, 37 and 38, which form a cam group, and an adjusting member 43 is shown, wherein a first cam group comprising cams 36, 37 and 38 is located on a first side of adjusting member 43, and a further cam group comprising the same cams 36, 37 and 38 is located on an opposite, second side of adjusting member 43. Cam 38 is constituted, by way of example, as a zero-lift cam in both cam groups. Alternatively, only one cam group on one side of adjusting member 43 can be provided.

In order to connect cams 36, 37 and 38 with one another and to connect the cams to adjusting member 43, a carrier body 31 is shown which is cast with cams 36, 37 and 38 and with a control contour element 44 of adjusting member 43. Carrier body 31 thus extends over the entire length of cam pack 12, and cams 36, 37 and 38 as well as control contour element 44 comprise through-bores, through which one-part carrier body 31 extends. For the casting of carrier body 31, two of cams 36, 37 and 38 in the given position for the formation of the cam groups and control contour element 44 can in each case be placed into an original moulding tool, said original moulding tool comprising further tool moulding parts in order to form the passage through carrier body 31. Once cams 36, 37 and 38 and control contour element 44 have been placed in the original moulding tool, carrier body 31 can be cast and hardened. The central passage region through cam pack 12 can be formed by a tool moulding part, the effect of which is that, in the internal regions, cutouts 33 remain free, through which an inner toothing 16 can extend, which is present on the inside in cams 36, 37 and 38. Inner toothing 16 represents the connection of cams 36, 37, 38 to the carrier shaft, the inner toothing being introduced on the inside in cams 36, 37, 38. Latching grooves can be provided on the inner side of cam pack 12 in another way that is not shown.

Control contour element 44 is embedded in the central region of carrier body 31 in such a way that adjusting member 43 arises with the corresponding section of carrier body 31. Securing sections 35 extend through the interior along shaft axis 11, said securing sections being able to engage in the convex regions in cams 36, 37 and 38, as is shown in greater detail in following FIG. 7 in the exploded view.

FIG. 7 shows a cam pack 12 according to FIG. 6 in an exploded view, wherein cams 36, 37 and 38, which form a front cam group on a first side of adjusting member 43, are represented detached. Further cams 36, 37 and 38 are shown in an already positioned arrangement with respect to one another on the second, rear side of adjusting member 43.

Adjusting member 43 comprises a control contour element 44 and a body portion of carrier body 31, and control contour element 44 comprises an outer control contour, which can cooperate with a control device which is disposed static beside the cam shaft and enables a displacement of cam pack 12 on carrier shaft 10 along shaft axis 11, see in this regard FIG. 1.

From the individual representation of cams 36, 37 and 38, it can be seen that the latter each comprise a through-bore 32, through which a part of carrier body 31 extends. The part of carrier body 31 that connects cams 36, 37 and 38 has a basket-like structure with securing sections 35 and circumferential collars 39. Securing sections 35 can engage in convex regions 34, which are introduced in the interior of through-bore 32 and are used for stabilization and securing against the rotation of cams 36, 37 and 38 and of adjusting member 43 relative to one another in the circumferential direction. Circumferential collars 39 sit in recesses 40, which are present on the side of cams 36 and 38. As a result of the form-fit connection of circumferential collars 39 of carrier body 31 with recesses 40 in cams 36 and 38, cams 36, 37 and 38 are connected to adjusting member 43 in an axially secured and mechanically loadable manner, said adjusting member being constituted by control contour element 44 and a portion of cast carrier body 31.

Cutouts 42 are also shown in a radial position beneath the cam group of cams 36 and 37, and integral mouldings 41 engage in cutouts 42, said integral mouldings being integrally moulded on carrier body 31.

The geometrical formations on carrier body 31 arise through corresponding mouldings on cams 36, 37 and 38 and on control contour element 44. The free surfaces of cast carrier body 31 shown in FIG. 6 are moulded on tool parts which are a component of an original moulding tool, into which cams 36, 37 and 38 and control contour element 44 are introduced before the material for the formation of carrier body 31 is cast.

The invention is not limited in its implementation to the aforementioned preferred examples of embodiment. On the contrary, a number of variants are conceivable, which make use of the presented solution even with fundamentally different embodiments. All the features and/or advantages emerging from the claims, the description or the drawings, including structural details or spatial arrangements, may be essential to the invention both in themselves as well as in the most varied combinations.

LIST OF REFERENCE NUMBERS 1 camshaft
10 carrier shaft
11 shaft axis
12 cam pack
13 cam, 13a end face
14 cam, 14a end face
15 adjusting member, 15a end face
16 inner toothing
17 outer toothing
18 latching groove
19 weld joint on the outer periphery
20 weld joint on the inner periphery
21 solder joint
22 tie rod
23 bearing element
24 bearing block
258 bearing
26 cam
27 cam
27' cam
28 cam
29 cam
30 groove guide
31 carrier body
32 through-bore
33 cutout
34 convex region
35 securing section
36 cam
37 cam
38 cam
39 circumferential collar
40 recess
41 integral moulding
42 cutout
43 adjusting member
44 control contour element
45 shoulder

The invention claimed is:

1. A camshaft, comprising:
   a carrier shaft configured to be mounted for rotation along a shaft axis and having an outer toothing;
   at least one cam pack configured to be axially displaced on said carrier shaft, said at least one cam pack including at least two cams and at least one adjusting member configured to axially adjust said at least one cam pack; and
   a carrier body integrally cast with and interconnecting said cams and said at least one adjusting member in an axially adjacent configuration, said at least one adjusting member having at least two parts including a first part formed by a control contour element and a second part formed by said cast carrier body;
   at least one of said cams or said at least one adjusting member including an inner toothing engaging in an axially displaceable manner with said outer toothing of said carrier shaft.

2. The camshaft according to claim 1, wherein said cast carrier body extends at least partially over an entire length of said at least one cam pack through through-bores formed in said cams and said at least one adjusting member.

3. The camshaft according to claim 2, wherein said cast carrier body is injection-molded or die-cast into said through bores, and said cast carrier body is formed of aluminum, magnesium or plastic material.

4. The camshaft according to claim 2, wherein said cast carrier body has cutouts formed therein through which said inner toothing extends pointing radially inwards.

5. The camshaft according to claim 4, which further comprises convex regions disposed in said through-bores, and a securing section of said cast carrier body introduced into said convex regions.

6. The camshaft according to claim 1, wherein said cast carrier body includes circumferential collars cast in recesses formed in said cams to create an axial securing of said cams.

7. The camshaft according to claim 1, wherein said cast carrier body includes integral moldings extending into cutouts to secure said cams against rotation.

8. The camshaft according to claim 1, wherein said control contour element is embedded in said cast carrier body.

9. The camshaft according to claim 1, wherein said at least one cam pack includes at least one bearing element.

10. The camshaft according to claim 9, wherein said at least one bearing element is configured to form a zero-lift cam.

11. A cam pack, comprising:
    at least two cams;
    at least one adjusting member configured to axially adjust the cam pack on a carrier shaft having an outer toothing; and
    a carrier body integrally cast with and interconnecting said cams and said at least one adjusting member in an axially adjacent configuration, forming a composite structure to be directly configured on the carrier shaft, said at least one adjusting member having at least two parts including a first part formed by a control contour element and a second part formed by said cast carrier body;
    at least one of said cams or said at least one adjusting member including an inner toothing configured to be engaged in an axially displaceable manner with the outer toothing of the carrier shaft.

12. A method for producing a camshaft, the method comprising the following steps:
    providing a carrier shaft configured to be mounted for rotation along a shaft axis and having an outer toothing;
    providing at least one cam pack including at least two cams and at least one adjusting member configured to axially adjust the at least one cam pack,
    placing the at least one cam pack axially displaceably on the carrier shaft;
    placing at least two of the cams in a position adjacent the at least one adjusting member;
    at least partially casting around the cams and the at least one adjusting member with a carrier body, forming a composite structure;
    placing the composite structure directly on the carrier shaft; and
    providing at least one of the cams or the at least one adjusting member with an inner toothing engaged in an axially displaceable manner with the outer toothing of the carrier shaft; and
    providing the at least one adjusting member with at least two parts including a first part formed by a control contour element and a second part formed by a portion of the carrier body partially cast around the control contour element in a casting process.

* * * * *